United States Patent [19]

Hatakeyama et al.

[11] Patent Number: 6,063,503

[45] Date of Patent: May 16, 2000

[54] OXYGEN-ABSORBING MULTI-LAYER FILM AND METHOD FOR PREPARING SAME

[75] Inventors: Hidetoshi Hatakeyama; Hideyuki Takahashi, both of Tokyo, Japan

[73] Assignee: Mitsubishi Gas Chemical Company, Inc., Tokyo, Japan

[21] Appl. No.: 08/769,797

[22] Filed: Dec. 19, 1996

[30] Foreign Application Priority Data

Dec. 28, 1995 [JP] Japan ................................. 7-343063

[51] Int. Cl.$^7$ .......................... B32B 27/08; B32B 27/00
[52] U.S. Cl. ........................................ 428/515; 428/500
[58] Field of Search ............................. 428/515, 500

[56] References Cited

U.S. PATENT DOCUMENTS

| | | | |
|---|---|---|---|
| 4,332,845 | 6/1982 | Nawata et al. | 428/35 |
| 4,485,133 | 11/1984 | Ohtsuka et al. | 426/124 |
| 4,487,791 | 12/1984 | Komatsu et al. | 428/35 |
| 4,524,015 | 6/1985 | Takahashi et al. | 252/188.28 |
| 4,536,409 | 8/1985 | Farrell et al. | 426/398 |
| 4,579,223 | 4/1986 | Otsuka et al. | 206/204 |
| 4,667,814 | 5/1987 | Wakamatsu et al. | 206/0.7 |
| 4,856,650 | 8/1989 | Inoue et al. | 206/204 |
| 4,992,410 | 2/1991 | Cullen et al. | 502/407 |
| 5,084,310 | 1/1992 | Hisazumi et al. | 428/34.8 |
| 5,089,323 | 2/1992 | Nakae et al. | 428/220 |
| 5,252,379 | 10/1993 | Kuribayashi et al. | 428/141 |
| 5,262,375 | 11/1993 | McKedy et al. | 502/406 |
| 5,274,024 | 12/1993 | Koyama et al. | 524/440 |
| 5,286,407 | 2/1994 | Inoue et al. | 252/188.28 |
| 5,332,590 | 7/1994 | McKedy et al. | 426/398 |
| 5,378,428 | 1/1995 | Inoue et al. | 422/9 |
| 5,405,880 | 4/1995 | Kimura et al. | 523/126 |
| 5,641,425 | 6/1997 | McKedy et al. | 252/188.28 |

FOREIGN PATENT DOCUMENTS

| | | |
|---|---|---|
| 0 688 666 A | 12/1995 | European Pat. Off. . |
| 695 628 A | 2/1996 | European Pat. Off. . |

OTHER PUBLICATIONS

Database WPI, Section Ch, Week 9631, Derwent Publications Ltd., London, GB, Class A17, AN 96–305180 of JP 08 132573 A (May 28, 1996).

*Primary Examiner*—Mukund J. Shah
*Assistant Examiner*—Deepak R. Rao
*Attorney, Agent, or Firm*—Frishauf, Holtz, Goodman, Langer & Chick, P.C.

[57] ABSTRACT

An oxygen absorbing multi-layer film having a smooth surface is provided. The multi-layer film includes an oxygen permeating resin layer, a deoxidizing resin layer containing a particulate absorbing composition, a smoothing layer and a gas barrier layer. The oxygen absorbing multi-layer film is produced by extruding a resin composition containing a particulate oxygen absorbing composition to form a deoxidizing resin layer on a surface of a polyolefin resin forming a smoothing layer as a substrate for lamination, laminating an oxygen-permeating resin layer to the upper surface of the deoxidizing resin layer and laminating a gas barrier material on a lower surface of the smoothing layer. The multi-layer film has no protrusions through the film surface and has excellent heat-sealing and handling properties.

20 Claims, 1 Drawing Sheet

FIG. 1

OXYGEN-ABSORBING MULTI-LAYER FILM AND METHOD FOR PREPARING SAME

BACKGROUND OF THE INVENTION (i) Field of the Invention

The present invention relates to a multi-layer film having an oxygen absorption ability and a method for preparing the same. More specifically, it relates to an oxygen-absorbing multi-layer film which comprises a deoxidizing resin layer as a middle layer comprising a deoxidizing resin composition in which a particulate oxygen absorbing composition is dispersed, an oxygen-permeating resin layer comprising a thermoplastic resin laminated on one surface of the middle layer, and a gas barrier layer laminated on the other surface of the middle layer via a smoothing layer comprising a polyolefin resin which can compensate roughness or unevenness occasionally generated by the particulate oxygen absorbing composition to impart a smooth surface onto the smoothing layer; and a method for preparing the oxygen-absorbing multi-layer film.

The oxygen-absorbing multi-layer film of the present invention is a highly practical oxygen-absorbing packaging material which is free from roughness on the surface of the film and which is excellent in surface smoothness and heat-sealing properties.

(ii) Description of the Related Art

Heretofore, a technique is known in which a multi-layer packaging material for forming packaging bags and packaging containers can be prepared by using, as a deoxidizing resin layer, a film or a sheet obtained by molding a thermoplastic resin in which a deoxidizing agent is dispersed, whereby an oxygen-absorbing ability is held in the packaging material itself. As the deoxidizing agent which can be used in the deoxidizing resin layer of the packaging material having the oxygen-absorbing ability, there has often been used, for example, a deoxidizing agent containing, as an essential component, an iron powder which is excellent in the oxygen-absorbing ability, as suggested by Japanese Patent Publication Nos. 32348/1986 and 1824/1987, Japanese Patent Application Laid-open No. 90847/1992, and the like. Furthermore, in these publications, an oxygen absorbing multi-layer constitution is disclosed in which outside the deoxidizing resin layer in which the deoxidizing agent is dispersed, a gas barrier layer for blocking the permeation of oxygen is laminated, and inside the deoxidizing resin layer, an isolating layer having an oxygen permeability is laminated which prevents the deoxidizing resin layer from directly coming in contact with a packaged matter and which is present on the side of the packaged matter.

As a method for preparing such an oxygen absorbing multi-layer material, there can be employed various lamination methods in compliance with materials and constitutions of layers. According to a conventional technique, particularly as the deoxidizing resin layer, there has been used a resin composition obtained by blending a polyolefin resin with an iron powder type deoxidizing agent, and as the isolating layer, there has often been selected a polyolefin resin which is compatible with the deoxidizing resin layer and which has an oxygen permeability. These layers may simultaneously be molten and extruded to laminate them, or alternatively, a film which will be the deoxidizing resin layer may be stuck on a film which will be the isolating layer.

However, when it is attempted to prepare the relatively thin oxygen absorbing multi-layer film containing the deoxidizing resin layer using the resin composition obtained by blending the particulate oxygen absorbing composition with the thermoplastic resin in accordance with the above-mentioned conventional technique, the particles of the particulate oxygen absorbing composition in the deoxidizing resin layer protrude on the side of the isolating layer, so that the film having the isolating layer of the smooth outer surface cannot be obtained. In an extreme case, the particles are exposed through the outer surface of the isolating layer, with the result that the deoxidizing resin layer might inconveniently directly come in contact with the packaged matter to contaminate it. Furthermore, when it is attempted to form the gas barrier layer, particularly a resin layer having gas barrier properties and a low melting point on the other surface of the deoxidizing resin layer by hot lamination, there occurs a problem that the smoothness of the outer surface of the gas barrier layer is lost as described above, and on occasion, the particles of the deoxidizing agent is exposed through the outer surface of the gas barrier layer, so that the gas barrier properties are impaired. In such a case, an satisfactory multi-layer film cannot be obtained.

Such a problem scarcely occurs in a thick sheet-like oxygen absorbing multi-layer material, and only in the case of the thin multi-layer film, the problem is caused owing to the particulate oxygen absorbing composition of the deoxidizing resin layer. That is to say, when the particulate oxygen absorbing composition to be used is smaller in particle diameter than the thickness of the oxygen absorbing multi-layer material, the roughness in the deoxidizing resin layer is small, and this roughness can be compensated by another layer. However, with regard to the film having a thickness of about 200 μm or less, the particle diameter of the particulate oxygen absorbing composition must be extremely reduced. However, it is very difficult to prepare the particulate oxygen absorbing composition of the fine particles, and the cost of the particulate oxygen absorbing composition thus prepared inevitably increases. In addition, the formation of the fine particles naturally leads to the increase in surface area, so that the obtained fine particles react with oxygen during their handling, which causes the danger of ignition.

In the present circumstances, therefore, the practical thin oxygen absorbing multi-layer material cannot be manufactured by the conventional methods.

SUMMARY OF THE INVENTION

In order that an oxygen absorbing multi-layer film may be a practical packaging material, it is necessary that (1) the thickness of the multi-layer film should be uniform, and its surface should be smooth; (2) a particulate oxygen absorbing composition should not expose through the surface of the multi-layer film on the side of a packed matter to avoid the contamination of the same, and there should not be problems of safety and sanitation; (3) gas barrier properties should be excellent; (4) the multi-layer film should have such thickness as to show a suitable flexibility; (5) as the packaging material, a heat seal should preferably be possible; and (6) cost should be low and industrial production should be possible.

Therefore, an object of the present invention is to provide a practical oxygen absorbing multi-layer film which can meet the above-mentioned requirements, i.e., in which even when a particulate oxygen absorbing composition such as an iron powder type deoxidizing agent having a prevalent particle diameter is used, these particles are not exposed through an isolating layer constituting the inner surface and a gas barrier layer constituting the outer surface of the multi-layer film and the surface of the multi-layer film is smooth.

Another object of the present invention is to provide a method for preparing the above-mentioned oxygen absorbing multi-layer film.

The present inventors have intensively investigated with the intention of solving the above-mentioned problems, and as a result, it has been found that the problems can be solved by a multi-layer film comprising a deoxidizing resin layer B using a thermoplastic resin composition in which a particulate oxygen absorbing composition is dispersed, an oxygen-permeating resin layer (hereinafter referred to as "the isolating layer" sometimes) A formed on one surface of the deoxidizing resin layer B, and a gas barrier layer D formed on the other surface of the deoxidizing resin layer B via a smoothing layer C comprising a polyolefin resin, and a method for preparing the multi-layer film which comprises forming the smoothing layer C between the deoxidizing resin layer B and the gas barrier layer D so as to be directly adjacent to the deoxidizing resin layer B, the smoothing layer C being formed by feeding a polyolefin resin film as a substrate film, the deoxidizing resin layer B being formed by extruding and laminating a resin composition for the deoxidizing resin layer on the substrate film, and then forming the oxygen-permeating resin layer A on the surface of the deoxidizing resin layer B. In consequence, the present invention has been attained.

The first aspect of the present invention is directed to an oxygen absorbing multi-layer film having a smooth surface which comprises a deoxidizing resin layer B comprising a deoxidizing resin composition obtained by dispersing a particulate oxygen absorbing composition in a thermoplastic resin, a smoothing layer C comprising a polyolefin resin laminated on the deoxidizing resin layer B, an oxygen-permeating resin layer A comprising a thermoplastic resin laminated on the outer surface of the deoxidizing resin layer B of the two-layer film whose both surfaces are smooth, and a gas barrier layer D laminated on the outer surface of the smoothing layer C.

Here, with regard to the oxygen absorbing multi-layer film of the present invention, the gas barrier layer D of the outer layer in the above-mentioned layer constitution is preferably made of a material having a melting point higher than that of the oxygen-permeating resin layer A, because the gas barrier layer D having such a high melting point can be heated at a high temperature without damaging this layer at the time of heat sealing the surface of the oxygen-permeating resin layer A.

Furthermore, the oxygen absorbing multi layer film of the present invention contains the deoxidizing resin layer B comprising the deoxidizing resin composition obtained by dispersing the particulate oxygen absorbing composition in the thermoplastic resin, but as the particulate oxygen absorbing composition, a composition containing an iron powder as an essential component is most preferable.

Additionally, in order to prevent the particles of the particulate oxygen absorbing composition from damaging the oxygen-permeating resin layer A and the gas barrier layer D, the maximum particle diameter of these particles is preferably smaller than the sum of the thickness of the deoxidizing resin layer B and that of the smoothing layer C, and in other words, the particles are preferably present in both the layers of the deoxidizing resin layer B and the smoothing layer C.

Moreover, it is preferable to add an additive such as calcium oxide to the deoxidizing resin layer B.

Another aspect of the present invention is directed to a method for preparing an oxygen absorbing multi-layer film having a smooth surface which comprises the steps of directly bringing a deoxidizing resin layer B comprising a thermoplastic resin containing a dispersed particulate oxygen absorbing composition into contact with a smoothing layer C comprising a polyolefin resin, laminating an oxygen-permeating resin layer A comprising a thermoplastic resin on the outer surface of the deoxidizing resin layer B, and then laminating a gas barrier layer D comprising a gas barrier material laminated on the outer surface of the smoothing layer C, the film of the polyolefin resin constituting said smoothing layer C being utilized as a substrate film for lamination, said method comprising the steps of extruding and laminating a deoxidizing resin composition constituting the deoxidizing resin layer B on one surface of the substrate film, and then laminating a thermoplastic resin constituting the oxygen-permeating resin layer A and a gas barrier material constituting the gas barrier layer D.

In the preparation method regarding the present invention, the film of the polyolefin resin constituting the smoothing layer C is used as the substrate film for lamination, and the deoxidizing resin composition containing the dispersed particulate oxygen absorbing composition which constitutes the deoxidizing resin layer B is extruded and laminated on the substrate film so as to directly come in contact therewith. As a result, the laminated structure having the deoxidizing resin layer B and the smoothing layer C can be obtained.

According to this lamination method, even if the particles of the particulate oxygen absorbing composition protrude from the surface of the deoxidizing resin layer B, most of the protruded particles can be compensated in the smoothing layer C, so that a smooth surface state can be obtained on the surface of the smoothing layer C, with the result that the gas barrier layer D can smoothly be formed on the smoothed surface.

In order to inhibit the protrusion of the particles on the other surface of the deoxidizing resin layer B and to smooth the outer surface of the oxygen-permeating resin layer A which is laminated on the other surface, the present invention includes a preferable embodiment of the above-mentioned method in which the deoxidizing resin composition which forms the deoxidizing resin layer B is molten and laminated on the smoothing layer C, and the oxygen-permeating resin layer A is laminated, a cooling roll is closely brought into contact with the outer surface of the oxygen-permeating resin layer A to cool it, whereby the outer surface can be smoothed.

On the outer surface of the deoxidizing resin layer B in the above-mentioned lamination structure, the oxygen-permeating resin layer A is laminated. It is preferable that the layer A which is in a molten and extruded state or in a film state is directly thermally fused onto the deoxidizing resin layer B or dry-laminated thereon via an adhesive layer, but the thermal fusion method is more preferable in a point that there is not any danger that the oxygen permeability of the oxygen-permeating resin layer A is impaired.

In the case of the thermal fusion method, the deoxidizing resin composition which forms the deoxidizing resin layer B and the thermoplastic resin which forms the oxygen-permeating resin layer A may be co-extruded and laminated on the substrate film which forms the smoothing layer C, but these resins may separately be extruded. In this case, in order to smooth the surface, there is preferred a method which comprises extruding the deoxidizing resin composition which forms the deoxidizing resin layer B on the substrate film, closely bringing a cooling roll into contact with the surface of the extruded deoxidizing resin composition to cool it, extruding the thermoplastic resin which forms the oxygen-permeating resin layer A thereon, and then closely bringing the cooling roll into contact with the surface of the extruded thermoplastic resin to cool it. In the case of the co-extrusion, it is preferred that the cooling roll is closely brought into contact with the extrusion surface of the thermoplastic resin which forms the oxygen-permeating resin layer A to cool it.

In addition, another method can be employed which comprises extruding and laminating the deoxidizing resin composition which forms the deoxidizing resin layer B between the substrate film for lamination and the film made of the thermoplastic resin which forms the oxygen-permeating resin layer A.

In this connection, in the case that a laminated film comprising the smoothing layer C, the deoxidizing resin layer B and the oxygen-permeating resin layer A is molded, the surface of the film can further be smoothed by closely bringing the cooling roll into contact with the outer surface of the oxygen-permeating resin layer A to cool it. At this time, when the cooling roll is closely contacted from the side of the smoothing layer C, the particulate oxygen absorbing composition is liable to undesirably protrude in the oxygen-permeating resin layer A.

The gas barrier layer can be obtained by laminating a gas barrier material on the surface of the smoothing layer C, but an optional lamination method can be selected in compliance with the kind of the gas barrier material. There can be employed a method which comprises laminating a foil-like or a film-like gas barrier material, if necessary, via an adhesive layer, a method which comprises melting, extruding and laminating, or a method which comprises first laminating the gas barrier on the substrate film regarding the smoothing layer C, and then forming the deoxidizing resin layer B and the oxygen-permeating resin layer A.

In preparing the oxygen absorbing multi-layer film having the above-mentioned layer constitution which forms the present invention, in the case that the smoothing layer C comprising the polyolefin resin film is formed between the deoxidizing resin layer B and the gas barrier layer D so as to be directly adjacent to the deoxidizing resin layer B, the deoxidizing resin layer B is extruded and formed by lamination on the polyolefin resin film of the smoothing layer C as the substrate film for lamination, whereby a combination of various lamination methods for the preparation of the multi-layer film which forms the present invention is possible. In consequence, the inner and outer surfaces of the multi-layer film are smooth without having roughness, and the particles of the deoxidizing resin composition can completely prevented from exposed through the inner surface of the isolating layer and the outer surface of the gas barrier.

Particularly, according to the preparation method which forms the present invention, in forming the deoxidizing resin layer B on the smoothing layer C, the lamination can be carried out while the cooling roll is closely brought into contact with the surface of the deoxidizing resin layer B or the surface of the oxygen-permeating resin layer A formed on the deoxidizing resin layer B to cool it, whereby solidification on the side of the cooled surface can be accelerated. Thus, protrusions based on the particles in the deoxidizing resin layer B can be compensated by the smoothing layer C, and therefore the surface of the smoothing layer C can be smoothed. In consequence, the protrusions based on the particles can be prevented from protruding into the oxygen-permeating resin layer A, and the roughness is prevented in the surface of the gas barrier layer. Therefore, the maximum particle diameter of the particles of the particulate oxygen absorbing composition which is blended with the deoxidizing resin layer B may be in excess of the thickness of the layer B, so long as it is not in excess of the sum of the thickness of the layer B and that of the layer C, and it is not necessary to particularly use a material having a fine particle diameter for the particulate oxygen absorbing composition.

The above-mentioned function can sufficiently be understood from the following fact. For example, in the case that a single film is formed by extruding a thermoplastic resin layer which is mixed with the particles of the deoxidizing agent and in which these particles are dispersed, even if the particle diameter of the particles to be blended is controlled to less than the thickness of the film, the particles are not always dispersed in the center of the thickness of the film. In consequence, the fine roughness by the protrusion of the particles is generated on the film surface of the molded resin layer, so that the film surface is not smooth and the thickness of the film is not uniform, either. This is considered to be due to the following mechanism. The transfer of the particles and the unevenness in thickness of the film itself in the thermoplastic resin layer take place by tension due to an abrupt pressure release and the take-up of the extruded resin at the time of the extrusion of the resin composition containing the particles from an extruder, so that the roughness takes places on the film surface.

Even if the isolating layer or the gas barrier layer is formed on both the surfaces of the thermoplastic resin layer having the thus generated roughness, the multi-layer material having the smooth surface cannot be obtained under the influence of this roughness. The particles protruded through the surface of the deoxidizing resin layer of the middle layer further invade the isolating layer or the gas barrier layer, which causes the exposure of the particles through these newly formed surfaces. Such a phenomenon similarly occurs also in the case that the multi-layer film is formed by a co-extrusion of 3 kinds and 3 layers so as to obtain a layer constitution that both the surfaces of the deoxidizing resin layer formed by mixing and dispersing the particulate deoxidizing agent may be sandwiched by other thermoplastic resin layers. In this case, the surface of the co-extruded multi-layer film is poor in smoothness, and the whole thickness inconveniently fluctuates. In this case, according to the observation of a film section, a wave pattern appears in each interface between the resin layers of the laminate, and a part of the particulate deoxidizing agent invades the other resin layer and in a certain case, there is seen a phenomenon that it reaches the surface.

DETAILED DESCRIPTION OF THE INVENTION

Figure 1:
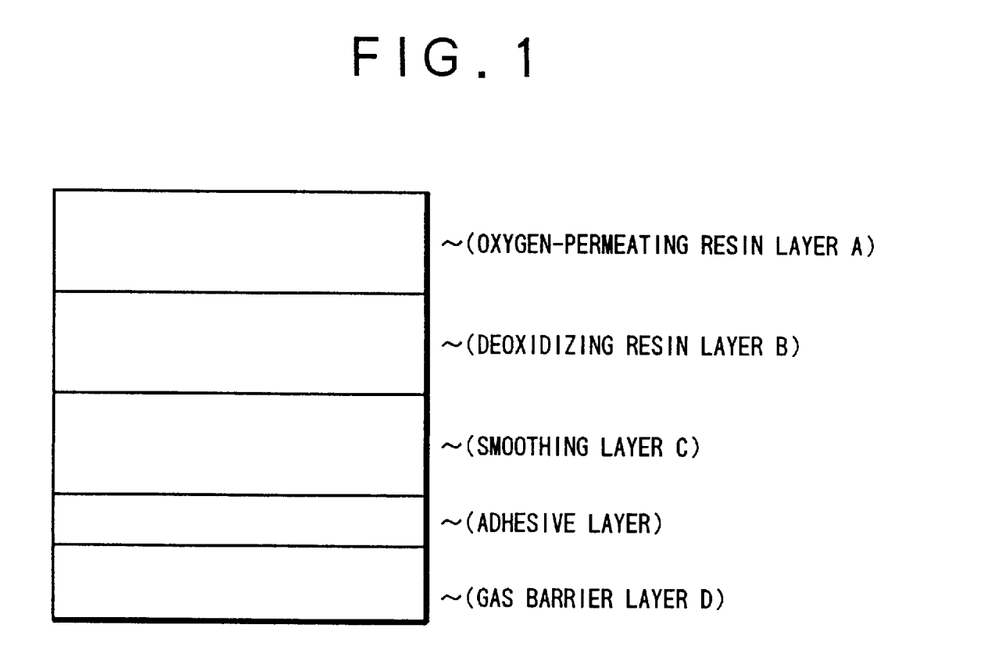
FIG. 1 is an enlarged sectional view of an oxygen absorbing multi-layer film having a smooth surface of the present invention.

An oxygen absorbing multi-layer film of the present invention (abbreviated simply to "the multi-layer film" or "the film" sometimes), as shown in FIG. 1, has a constitution that an oxygen-permeating resin layer A comprising a thermoplastic resin, a deoxidizing resin layer B obtained by dispersing a particulate oxygen absorbing composition in the thermoplastic resin, a smoothing layer C comprising a polyolefin resin and a gas barrier layer D are laminated in this order. The layers A and D are arranged at the outermost positions, respectively. Preferably, the layer B is directly brought into contact with and thermally fused to the layers A and C. Furthermore, the layers C and D may be laminated on each other via a layer of an adhesive or the like.

The oxygen-permeating resin layer (the isolating layer) A is positioned as the innermost layer of the packaging material on the side of the packed matter. This layer A plays the role of the isolating layer for preventing chemical components and odorous components in the deoxidizing resin layer B from coming in contact with or transferring to the packed matter such as a food, and it also has the function of permeating oxygen and water on the side of the packed matter through itself and forwarding them to the layer B so that the adjacent deoxidizing resin layer B may exert a deoxidizing ability. The isolating layer A is preferably a non-porous resin film, but it is required to have a suitable oxygen permeability and moisture vapor permeability. In addition, the isolating layer A is also a heat-sealing layer in the case that it is used as the packaging material, and therefore it preferably has heat-sealing properties.

The isolating layer A comprises a thermoplastic resin having the oxygen permeability, and typical examples of the usable thermoplastic resin include polyolefinic resins such as polyethylene, polypropylene, various kinds of ethylene-a-olefin copolymers, ethylene-acrylic acid (or methacrylic acid, or maleic anhydride) copolymers, ethylene-vinyl acetate copolymer, ionomers, polybutene and polymethylpentene. The thermoplastic resin is preferably selected in consideration of hot adhesive properties to the adjacent deoxidizing resin layer B.

These resins may be used singly or in the form of a blend or a multi-layer film. As the isolating layer A, there may be used a molten coating film obtained by melting and extruding pellets, or an already molded film. As the film, various kinds of polyolefinic resin films can suitably be used, and a commercially available composite sealant film may also be used in order to impart easy peel properties to the isolating layer A. In this connection, a pigment for coloring and a filler may be added to the thermoplastic resin which forms the isolating layer A, so long as they do not impair the function of the isolating layer A.

The oxygen permeability of the isolating layer A is preferably 1000 cc/m$^2$·atm·day (23° C., 100% RH) or more, and in order to secure the oxygen permeability, the thinner the isolating layer A is, the better. However, in order to obtain a suitable sealing strength as the sealant layer, and in order not to impair the isolating properties of the isolating layer A by the formation of pinholes at the time of preparation or use, the suitable thickness is necessary, and hence the thickness of the isolating layer A is preferably in the range of 5 to 100 $\mu$m, more preferably 10 to 50 $\mu$m.

The deoxidizing resin layer B comprises a deoxidizing resin layer obtained by dispersing the particulate oxygen absorbing composition in the thermoplastic resin. As the particulate oxygen absorbing composition, a particulate oxygen absorbing composition containing metallic iron as a main component for an oxygen absorbing reaction is particularly preferable from the viewpoints of an oxygen absorbing ability, safety, cost and the like. As the metallic iron, an iron powder which has been used in an iron powder type deoxidizing agent can be used, and examples of the usable iron powder include iron powders such as a reducing iron powder and a spray iron powder, ground iron materials of a steel material or a cast iron, and an iron powder such as a ground product. The maximum particle diameter of the iron powder may be in excess of the thickness of the deoxidizing resin layer B but must not be in excess of the sum of the thickness of the layer B and that of the smoothing layer C. The average particle diameter of the iron powder is selected in the range of 1 to 50 $\mu$m. In the particulate oxygen absorbing composition regarding the present invention, the metallic fine powder having danger such as ignition or the expensive metallic fine powder is not always required to be used.

As the other components of the particulate oxygen absorbing composition containing the metallic iron as the essential component, a metal halide can mainly be used, and examples of the preferably usable metal halide include chlorides, bromides and iodides of alkali metals and alkaline earth metals. The amount of the metal halide to be blended is preferably selected in the range of 0.1 to 20 parts by weight with respect to 100 parts by weight of the metallic iron.

The metal halide is preferably allowed to adhere to the surfaces of the metallic iron to prepare the oxygen absorbing composition, and the resultant composition is then blended with the thermoplastic resin. When the metal halide is integrally allowed to adhere to the surfaces of the metallic iron, the catalytic function of the metal halide can effectively be exerted, so that the amount of the metal halide to be blended can be reduced to 0.1 to 10 parts by weight with respect to 100 parts by weight of the metallic iron. Also in the case that the oxygen absorbing composition is integrally processed to form the particles, it is preferred that the maximum diameter of the particles is not in excess of the sum of the thickness of the layer B and that of the smoothing layer C, as described above.

As the thermoplastic resin in which the particulate oxygen absorbing composition is dispersed, an oxygen-permeating thermoplastic resin is preferable, as in the case of the resin which can be used for the isolating layer A, but no particular restriction is put on the kind of thermoplastic resin. The thermoplastic resin having an oxygen permeability constant of 200 cc·0.1 mm/m$^2$·atm·day (23° C., 100% RH) or more is preferable. Typical examples of the usable thermoplastic resin include polyolefinic resins such as polyethylene, polypropylene, various ethylene copolymers, modified polyolefins and elastomers, and these resins can be used singly or in the form of a blend.

The blend amount of the particulate oxygen absorbing composition in the deoxidizing resin layer B is preferably in the range of 2 to 90 parts by weight, more preferably 5 to 70 parts by weight with respect to 100 parts by weight of the thermoplastic resin in consideration of a deoxidizing ability and film processing properties. The thickness of the deoxidizing resin layer B is usually preferably in the range of 10 to 100 $\mu$m, and it should be decided in consideration of the properties of the oxygen absorbing composition, the deoxidizing ability and the film processing properties.

Furthermore, an alkaline earth metal oxide such as calcium oxide can be added to and dispersed in the deoxidizing resin layer B, whereby foaming at the time of film working can be prevented and the loss of the oxygen absorbing ability of the prepared multi-layer film of the present invention can also be prevented, and improved storage properties can be imparted to the deoxidizing resin layer B. The amount of the above-mentioned alkaline earth metal oxide is preferably 0.5 to 5 parts by weight with respect to 100 parts by weight of the particulate oxygen absorbing composition. In addition, additives such as a deodorant component, a coloring component and a water-holding component can be blended with the deoxidizing resin layer B. The maximum particle diameter of these additives is particularly preferably not more than the sum of the thickness of the layer B and that of the smoothing layer C, as described above.

The smoothing layer C comprises a polyolefinic resin, and it is a layer for compensating the protruded portions of the particles in the layer B at the time of the molding of the deoxidizing resin layer B, and it is a specific layer which forms the present invention. The resin from which the smoothing layer C is formed is preferably selected from polyolefinic resins which are compatible with and can be thermally fused to the resin of the deoxidizing resin layer B, and can be softened at an extrusion temperature of the layer B, and it is preferably selected from various polyethylenes and polypropylenes in compliance with the extrusion temperature of the layer B. For the smoothing layer C, a film is usually used which can be molded from pellets. The thickness of the smoothing layer C is such that the sum of the thickness of the smoothing layer C and that of the deoxidizing resin layer B is in excess of the maximum particle diameter of the particles blended with the deoxidizing resin layer B. In general, the thickness of the smoothing layer C is suitably selected in the range of 10 to 50 $\mu$m.

The gas barrier layer D is arranged at the outermost position of the packaging material. As the gas barrier layer D, there can be used a foil or a film material which can be laminated as one of the layers constituting the multi-layer film which forms the present invention, and can minimize the invasion of oxygen from the outside of the gas barrier layer. The gas barrier layer D may be a single layer or a composite layer, and other layers can be formed inside and outside the layer having the gas barrier properties for the purpose of printing or concealment. In heat-sealing the multi-layer film of the present invention, it is preferred that the melting point of the gas barrier layer D is higher, preferably 20° C. or more higher than the melting point of the resin for the isolating layer A, and when the melting points are different in this way, the heat sealing is possible on the isolating layer A by heating from the side of the gas barrier layer D.

As the gas barrier layer D, for example, films obtained by vapor-depositing aluminum, aluminum oxide, silicon oxide and the like on surfaces of a metal foil such as aluminum foil, nylon films such as nylon-6 and nylon MXD-6, polyester films such as polyethylene terephthalate and polybutylene terephthalate, nylon films and polyester films can be used singly or in a combination thereof. Furthermore, an ethylene-vinyl alcohol copolymer having a relatively low melting point can also be used when any of the above-mentioned materials can be laminated thereon. In particular, composite films such as a laminate of polyester film/ aluminum foil, a polyvinylidenechloride coated nylon film, a laminate of polyvinylidenechloride coated nylon film/ aluminum foil, a laminate of nylon-6 film/nylon MXD-6 film and a metal oxide-vapor deposited polyester film can suitably be used. The deoxidizing resin layer D and the smoothing layer C can be adhesively laminated via a layer of an adhesive or the like.

The preparation process of the multi-layer film will be described in detail. In further laminating the thermoplastic resin which forms the oxygen-permeating resin layer A on the deoxidizing resin layer B obtained by extruding the deoxidizing resin composition on the smoothing layer C, it is preferred that a cooling roll is closely brought into contact with and laminated on the surface of the thermoplastic resin laminated on the layer B to cool it, whereby the solidification of the surface of the multi-layer film is accelerated and smoothed. In this case, the layer A may be formed by the adhesive lamination or the extrusion lamination of the film.

Similarly, in melting and extruding the deoxidizing resin composition between the smoothing layer C and the oxygen-permeating resin layer A to achieve the lamination, it is preferred that the cooling roll is closely brought into contact with the surface of the layer A to cool it, whereby the solidification of the film surface is accelerated and smoothed.

In this case, the resin composition which forms the deoxidizing resin layer B is extruded in a molten state on the smoothing layer C, and therefore the resin of the layer C becomes a softened state. Under this state, the cooling roll is pressed under cooling on the side of the oxygen-permeating resin layer A, whereby while protrusions based on the particles in the resin composition which forms the layer B are compensated by the softened layer C, the resin composition regarding the layer B is cooled and solidified. In consequence, the protrusion of the particles to the side of the layer A can be prevented. The temperature of the cooling roll can suitably be selected in consideration of the kind and the characteristics as well as the take-up rates of resins of the respective layers.

According to the preparation method which forms the present invention, the polyolefin resin layer which forms the smoothing layer C is used as the substrate film for lamination, and the deoxidizing resin composition which forms the deoxidizing resin layer B is formed thereon by extrusion lamination. In this extrusion lamination, however, there are a method which comprises co-extruding the thermoplastic resin composition which forms the oxygen-permeating resin layer A and the deoxidizing resin composition to achieve the lamination, a method which comprises separately extruding and laminating, and a method which comprises extruding the deoxidizing resin composition between the thermoplastic resin composition and the substrate film for the lamination to achieve the lamination, but concretely, the known lamination methods can suitably be combined in compliance with the layer constitution of the multi-layer film as well as the materials and the characteristics of the respective layers, and for example, the following combinations of the lamination steps can be selected.

Method I: A method which comprises (1) a step of extruding and laminating the deoxidizing resin composition which forms the deoxidizing resin layer B on the smoothing layer C, (2) a step of further laminating the polyolefin resin which forms the oxygen-permeating resin layer A on the layer B of the film of the layer constitution comprising the layer B/the layer C obtained in the previous step, and (3) a step of laminating the gas barrier layer on the side of the layer C of the film of the layer constitution comprising the layer A/the layer B/the layer C obtained in the previous step to form the gas barrier layer D.

Method II: A method which comprises (1) a step of laminating the smoothing layer C and the gas barrier materials which forms the gas barrier layer D, (2) a step of extruding and laminating the deoxidizing resin composition which forms the deoxidizing resin layer B on the layer C of the film of the layer constitution comprising the layer C/the layer D obtained in the previous step, and (3) a step of laminating the thermoplastic resin which forms the oxygen-permeating resin layer A on the layer B of the film of the layer constitution comprising the layer B/the layer C/the layer D obtained in the previous step.

Method III: A method which comprises (1) a step of co-extruding and laminating the thermoplastic resin which forms the oxygen-permeating resin layer A and the deoxidizing resin composition which forms the deoxidizing resin layer B on the smoothing layer C, and (2) a step of laminating the gas barrier material which forms the gas barrier layer on the side of the layer C of the film of the layer constitution comprising the layer A/the layer B/the layer C obtained in the previous step.

Method IV: A method which comprises (1) a step of extruding and laminating the deoxidizing resin composition which forms the deoxidizing resin layer B between the smoothing layer C and the oxygen-permeating resin layer A, and (2) a step of laminating the gas barrier material which forms the gas barrier layer on the side of the layer C of the film of the layer constitution comprising the layer A/the layer B/the layer C obtained in the previous step.

Method V: A method which comprises (1) a step of laminating the smoothing layer C and the gas barrier material which forms the gas barrier layer D. and (2) extruding and laminating the resin composition which forms the deoxidizing resin layer B between the layer C of the film of the layer constitution comprising the layer D/the layer C obtained in the previous step and the film or the molten film of the thermoplastic resin which forms the oxygen-permeating resin layer A.

Next, the present invention will be described in more detail. The scope of the present invention should not be limited to these examples.

EXAMPLE 1

In the first place, 500 kg of a reduced iron powder (average particle diameter=25 μm, maximum particle diameter=80 μm) was placed in a ribbon blender equipped with a heating jacket, and 15 kg of a 50 wt % aqueous calcium chloride solution was sprayed on the iron fine powder through a liquid injection nozzle under reduced pressure and heating with stirring to deposit calcium chloride on the surface of the iron fine powder, followed by drying, thereby obtaining dried particles. Next, the particles were taken out of the blender, and then sifted to prepare a particulate oxygen absorbing composition which was free from coarse particles having a particle diameter of 75 μm or more.

The particulate oxygen absorbing composition was kneaded with a low density polyethylene (LDPE) in a mixing ratio of 50:50 (by weight) and then extruded by a twin-screw extruder equipped with vents, and the resulting strand was cooled and then cut by a cutter to obtain the pellets I of a deoxidizing resin composition. Similarly, calcium oxide (average particle diameter=10 μm, maximum particle diameter=50 μm) was kneaded with the low density polyethylene in a mixing ratio of 50:50 (by weight) and then extruded by the twin-screw extruder equipped with vents to obtain the pellets II of a resin composition.

Next, a mixture of the pellets I of the deoxidizing resin composition and the pellets II containing calcium oxide (weight ratio=98:2) was extruded on one surface of a running film (thickness=25 μm) (a layer C: a smoothing layer) of a commercially available linear low density polyethylene (LLDPE) from the first extruder of a tandem extrusion laminator having two extruders comprising a single screw extruder, a T-die and a cooling roll so that the thickness of the mixture might be 60 μm (a layer B: an oxygen absorbing resin layer), and the cooling roll was then brought into contact with the surface of the obtained deoxidizing resin layer to cool it, thereby obtaining a laminated film comprising the layer B and the layer C. In succession, a mixture of a commercially available polyethylene-based sealant resin (made by Mitsui Du Pont Chemical Co., Ltd., trade name CMPS) and polyethylene pellets containing 60 wt % of titanium oxide (made by Toyo Ink Mfg. Co., Ltd., white master batch) (weight ratio=90:10) was extruded on the layer B of the film from the second extruder of the laminator so that the thickness of the mixture might be 25 μm (a layer A: an oxygen-permeating resin layer), and the cooling roll was then brought into contact with the surface of the obtained layer A to cool it, thereby obtaining a multi-layer film comprising the layer A, the layer B and the layer C. The take-up rate of the film in the above-mentioned step was 50 m/min.

Furthermore, polyethylene was extruded between the smoothing layer C of the multi-layer film and the printed surface of a gas barrier nylon-6 film/nylon MXD-6 film multi-layer film (made by Mitsubishi Chemical Industries, Ltd., trade name Super Neal) on one surface of which an image was printed so that the thickness of the polyethylene might be 20 μm to laminate both the films via this polyethylene layer, thereby preparing an oxygen absorbing multi-layer film comprising the oxygen-permeating resin layer A, the deoxidizing resin layer B, the smoothing layer C (LLDPE) and gas barrier layer D (the gas barrier multi-layer film).

Next, reference will be made to the evaluation of the thus prepared oxygen absorbing multi-layer film and the results of the evaluation.

(1) Observation of a layer section by a microscope: The oxygen absorbing multi-layer film was cut by the use of a sharp razor into a rectangle having a length of 4 cm and a width of 2 mm, and its section was observed by a microscope.

According to the observation by the microscope, in the interface between the layer B and the layer C, the particles of the layer B partially invaded the layer C, but in the interface between the layer A and the layer B, the invasion of the particles of the layer B into the layer A was not observed and any wave pattern was not present in the interface. In addition, it was not observed that the particles of the layer B transferred to the layer D through the layer C. After all, both the surfaces of the layer A and the layer D of the oxygen absorbing multi-layer film were smooth and an inconvenience such as roughness was not observed at all.

(2) Leakage test: Five 4-edge-sealed bags (size=100 mm×200 mm) were made of two oxygen absorbing multi-layer films, the layer A being used as an inner layer, and 200 cc of a 5 wt % aqueous acetic acid solution was poured into each bag and it was airtightly heat-sealed. After the sealed bags were allowed to stand at 40° C. for 24 hours, and the bags were opened to take out the aqueous acetic acid solution and iron in the solution was quantitatively analyzed by colorimetry using potassium rhodanate.

As a result of the analysis, it was apparent that in all of the five specimens, the concentration of iron ions was less than a detection limit (1 ppm), and the leakage of iron ion which was a deoxidizing agent component was not substantially observed.

(3) Oxygen absorption test: 230 cc of boiling water was poured into a tray container (length=130 mm, width=90 mm, depth=25 mm, internal volume=270 cc) obtained by vacuum-forming a multi-layer gas barrier sheet (layer constitution=polypropylene/adhesive/nylon MXD-6/adhesive/polypropylene, thickness=600 μm), and the tray container was airtightly heat-sealed, using the oxygen absorbing multi-layer film of the present invention as a top film (a lid material, an inner layer=the layer A). The container in which the boiling water was sealed up was cooled to room temperature, and then stored as it was. After 3 days, an oxygen concentration in the container was analyzed by gas chromatography, and it was apparent that the oxygen concentration was 0.1% or less. After one month, the container was opened to inspect the inside of the top film, but the formation of iron rust was not observed therein.

EXAMPLE 2

The particulate oxygen absorbing composition prepared in Example 1 and polypropylene were extruded in a weight ratio of 50:50 by a twin-screw extruder equipped with vents, and the resulting strand was cooled and then cut by a cutter to obtain the pellets I' of a deoxidizing resin composition.

A mixture of the pellets I' of the deoxidizing resin composition, the resin composition II and polypropylene containing 60 wt % of titanium oxide (Japanese Pigment Co., Ltd., white master batch) in a ratio of 89:1:9 (weight ratio) was extruded between two films of a polypropylene film (CPP, thickness=30 μm) (a layer A) and a polypropylene ratio=98:2) was extruded between a polyethylene film (thickness=30 μm) (a layer A) and the printed surface of a nylon-6 film/nylon MXD-6 film multi-layer gas barrier film (made by Mitsubishi Chemical Industries, Ltd., trade name Super Neal) (a layer D) on one surface of which an image was printed so that the thickness of the mixture might be 60 μm (a layer B: a deoxidizing resin layer), and a cooling roll was then brought into contact with the surface of the polypropylene film (the layer A) to cool it, thereby obtaining an oxygen absorbing multi-layer film comprising the layer constitution of the layer D, the layer B and the layer A from the side of the cooling roll but not having any smoothing layer C.

The thus obtained multi-layer film was evaluated in the same manner as in Example 1. The results are shown in Table 1.

TABLE 1

|  |  | Example 1 | Example 2 | Comp. Ex. 1 |
| --- | --- | --- | --- | --- |
| (1a) | Observation of a layer section by a microscope | A wave pattern was not present between the layers A and B, and the protrusions of the particles of the layer B did not invade the layers A and D. | Same as left | Protrusions on the surface of the layer B noticeably invaded the layer A. |
| (1b) | Surface state of a laminated film | Smoothness of the surface was good. | Same as left | Same as left |
| (2) | Leakage of iron ion (Conc. of iron ion) | 1 ppm or less | 1 ppm or less | 50 ppm or more |
| (3a) | Absorption test Conc. of $O_2$ in the container | 0.1% or less | 0.1% or less | 0.1% of less |
| (3b) | Rust formation on the inner surface of the lid material (after 11 months) | No rust formation on the back surface of the film | No rust formation on the back surface of the film | Formation of rust on the back surface of the film | film (a layer C, a smoothing layer) of an aluminum foil laminate film obtained by dry-laminating the polypropylene film (thickness=30 μm) and a PET film on both the surfaces of an aluminum foil (a layer D) by the use of an extrusion laminator having a single screw extruder, a T-die and a mirror-polished cooling roll so that the thickness of the mixture might be 80 μm (a layer B, a deoxidizing resin layer), and the cooling roll was then brought into contact with the surface of the polypropylene film (the layer A) to cool it, thereby obtaining an oxygen absorbing multi-layer film comprising the CPP (the layer A), the deoxidizing resin layer (the layer B), the PP (the layer C), the aluminum foil (the layer D) and the PET.

For the thus prepared oxygen absorbing multi-layer film, the observation of a layer section by a microscope, a leakage test and an oxygen absorption test were carried out as in Example 1. However, in the case of the oxygen absorption test, after the heat seal of a top film, a specimen was subjected to a retort treatment at 121° C. for 30 minutes, and then stored at room temperature. The results are shown in Table 1.

COMPARATIVE EXAMPLE 1

In accordance with the same procedure as in Example 1, a mixture of the pellets I of a deoxidizing resin composition and a resin composition II containing calcium oxide (weight According to the present invention, even if particles containing coarse particles are used in a particulate oxygen absorbing composition blended in a deoxidizing resin layer, a smooth multi-layer film having neither unevenness nor roughness in thickness on its surface can be obtained. In particular, the particles in the deoxidizing resin layer are completely prevented from protruding to an oxygen-permeating resin layer as the inner layer or a gas barrier layer as the outer layer of the multi-layer film. As a result, the particulate oxygen absorbing composition does not come in contact with a packed matter, and even if the packed matter is liquid, neither the leakage of a deoxidizing resin composition nor the contamination of the packed matter with the deoxidizing resin composition is present. In consequence, a packaging film which is excellent in safety and sanitation can be obtained.

In addition, what is particularly mentioned is that such a fine iron powder as to be contained in the layer of the composition need not always be selected as an iron powder which is the essential component of the deoxidizing resin composition, and therefore, even if there is used the fine iron powder containing the coarse particles having an average particle diameter of several tens microns and a diameter in excess of the thickness of the deoxidizing resin layer which have been used as a usually used and known iron powder deoxidizing agent, an oxygen absorbing multi-layer film can be manufactured, which is a large merit.

According to the preparation method of the present invention, various lamination methods can be combined in compliance with the layer constitution of the multi-layer film as well as the materials and the properties of the respective layers, whereby the oxygen absorbing multi-layer film which is homogeneous and free from unevenness in thickness, has a smooth film surface, can suppress the exposure of the deoxidizing resin composition, and is excellent in safety and sanitation can be manufactured on an industrial scale.

In addition, as the additional functions of the packaging films, the suitable selection of the gas barrier material in compliance with the packed matter and the indication of a trade name, an image or the like by printing are important factors, but according to the multi-layer film and its preparation method regarding the present invention, the film comprising layers A, B and C can previously be formed, and the suitably selected layer D can be formed in compliance with each use purpose, whereby the above-mentioned additional functions can be imparted. Accordingly, the oxygen absorbing multi-layer film having many additional functions and a smooth surface can economically be obtained.

Moreover, the multi-layer film of the present invention is excellent in gas barrier properties and oxygen absorbing ability, and it can be utilized, as a packaging material having a reliable heat sealability, for the preservation of foods, cosmetics, medicines, daily necessities and the like which are easily affected by oxygen and easily rotted. By the multi-layer film itself of the present invention, bags can be prepared, but packaging bags having one transparent surface can be prepared by combining the multi-layer film with another gas barrier film such as a transparent film, and tube-like containers can also be prepared. In addition, the multi-layer film of the present invention can be used as parts of the containers, for example, lids for trays, cups, bottles and the like, and as a part or all of the walls of the containers. Furthermore, the multi-layer film of the present invention can be pasted inside the containers or caps, whereby the oxygen absorbing ability can be imparted to packaging containers.

What is claimed is:

1. An oxygen absorbing multi-layer film having a smooth surface which comprises an oxygen permeating resin layer A comprising a thermoplastic resin, said oxygen permeating resin layer A having a smooth upper outer surface and an inner lower surface, a deoxidizing resin layer B comprising a deoxidizing resin composition obtained by dispersing a particulate absorbing composition in a thermoplastic resin, said deoxidizing resin layer B having a thickness of 10 to 100 $\mu$m, said deoxidizing resin layer B having an upper surface and a smooth lower surface, said deoxidizing resin layer B being laminated to the lower surface of said oxygen permeating layer A, a smoothing layer C comprising a polyolefin resin, said smoothing layer C having a thickness of 10 to 50 $\mu$m, said smoothing layer C having an upper surface and a lower surface, said smoothing layer C being laminated on the smooth lower surface of said deoxidizing resin layer B, and a gas barrier layer D comprising a gas barrier material laminated on the lower surface of the smoothing layer C, said particulate oxygen absorbing composition having a maximum particle diameter which is less than the sum of the thickness of said deoxidizing resin layer B and said smoothing layer C.

2. The oxygen absorbing multi-layer film having a smooth surface according to claim 1 wherein the melting point of the gas barrier layer D is higher than that of the oxygen-permeating resin layer A.

3. The oxygen absorbing multi-layer film having a smooth surface according to claim 1 wherein the particulate oxygen absorbing composition consists essentially of an iron powder.

4. The oxygen absorbing multi-layer film having a smooth surface according to claim 3 wherein the particulate oxygen absorbing composition further comprises a metal halide which is integrally permitted to adhere to the surfaces of the iron.

5. The oxygen absorbing multi-layer film having a smooth surface according to claim 1 wherein the deoxidizing resin layer B further comprises calcium oxide.

6. The oxygen absorbing multi-layer film having a smooth surface according to claim 1 which is produced by a method wherein the smooth upper surface of the oxygen-permeating resin layer A is pressed by a cooling roll.

7. The oxygen absorbing multi-layer film having a smooth surface according to claim 1 which is produced by a method wherein the resin composition of the deoxidizing resin layer B is extruded in a molten state on the smoothing layer C, thereby, the polyolefin resin of the smoothing layer C becomes softened, and a cooling roll is pressed on the outer surface of the oxygen-permeating resin layer A.

8. The oxygen absorbing multi-layer film having a smooth surface according to claim 1 wherein a protrusion of particles of the particulate oxygen absorbing composition of the deoxidizing resin layer B is compensated by the smoothing layer C to obtain a smooth surface.

9. The oxygen absorbing multi-layer film having a smooth surface according to claim 1 wherein the multi-layer film has a thickness of 200 $\mu$m or less.

10. The oxygen absorbing multi-layer film having a smooth surface according to claim 1 wherein the oxygen-permeating resin layer A comprises a thermoplastic resin selected from the group consisting of polyethylene, polypropylene, ethylene-acrylic acid copolymer, ethylene-methacrylic acid copolymer, ethylene-maleic anhydride copolymer, ethylene-vinyl acetate copolymer, an ionomer, polybutene and polymethylpentene; said oxygen-permeating layer A has an oxygen permeability of 1000 cc/m$^2$·atm·day or more, measured at 23° C. and at a relative humidity of 100%, said oxygen-permeating resin layer A having a thickness of 10 to 50 $\mu$m; the particulate oxygen absorbing composition comprises an iron powder having an average particle size of 1 to 50 $\mu$m; said particulate oxygen absorbing composition being in an amount of 2 to 90 parts by weight with respect to 100 parts by weight of the thermoplastic resin of said deoxidizing resin layer B; said thermoplastic resin of said deoxidizing resin layer B being selected from the group consisting of polyethylene, polypropylene, an ethylene copolymer and an elastomer; said thermoplastic resin of the deoxidizing resin layer B has an oxygen permeability of 200 cc·0.1 mm/m$^2$·atm·day or more, measured at 23° C. and at a relative humidity of 100%; said smoothing layer C comprising a polyolefin resin selected from the group consisting of polyethylene and polypropylene; and the melting point of said gas barrier layer D is 20° C. or more higher than the melting point of said oxygen-permeating layer A.

11. The oxygen absorbing multi-layer film having a smooth surface according to claim 10 wherein said particulate oxygen absorbing composition further comprises a metal halide selected from the group consisting of a chloride of an alkali metal, a bromide of an alkali metal, an iodide of an alkali metal, a chloride of an alkaline earth metal, a bromide of an alkaline earth metal and an iodide of an alkaline earth meal, said metal halide being in an amount of 0.1 to 20 parts by weight with respect to 100 parts by weight of the metallic iron.

12. A method for preparing an oxygen absorbing multilayer film having a smooth surface which comprises directly extruding a deoxidizing resin composition obtained by dispersing a particulate oxygen absorbing composition in a thermoplastic resin to form a deoxidizing resin layer B having an upper surface and a lower surface, and laminating the deoxidizing resin layer B on an upper surface of a smoothing layer C serving as a substrate film for lamination, said smoothing layer C comprising a polyolefin resin, laminating an oxygen-permeating resin layer A comprising a thermoplastic resin on the upper surface of the deoxidizing resin layer B, and laminating a gas barrier layer D comprising a gas barrier material on a lower surface of the smoothing layer C.

13. The method for preparing an oxygen absorbing multilayer film having a smooth surface according to claim 12 wherein when the deoxidizing resin composition constituting the deoxidizing resin layer B is extruded on the substrate film for lamination and the thermoplastic resin constituting the oxygen-permeating resin layer A is laminated, a cooling roll is closely brought into contact with the upper outer surface of the oxygen-permeating resin layer A, and the gas barrier layer is further laminated.

14. The method for preparing an oxygen absorbing multilayer film having a smooth surface according to claim 13 wherein the deoxidizing resin composition constituting the deoxidizing resin layer B and the thermoplastic resin constituting the oxygen-permeating resin layer A are coextruded on the substrate film for lamination, or they are separately extruded, and while a cooling roll is closely brought into contact with the upper outer surface of the thermoplastic resin constituting the oxygen-permeating resin layer A to cool it, extrusion lamination is carried out, and the gas barrier layer is laminated.

15. The method for preparing an oxygen absorbing multilayer film having a smooth surface according to claim 13 wherein the deoxidizing resin composition constituting the deoxidizing resin layer B is extruded between the substrate film for lamination and the thermoplastic resin film constituting the oxygen-permeating resin layer A, and while the cooling roll is closely brought into contact with the outer surface of the thermoplastic resin film to cool it, extrusion lamination is carried out, and the gas barrier layer is laminated.

16. The method for preparing an oxygen absorbing multilayer film having a smooth surface according to claim 14 wherein (a) the gas barrier layer is laminated on the substrate film and (b) in succession, the deoxidizing resin composition constituting the deoxidizing resin layer B and the thermoplastic resin constituting the oxygen-permeating resin layer A are extruded, or the deoxidizing resin composition and the thermoplastic resin which forms the oxygen-permeating resin layer A are separately extruded to achieve extrusion lamination.

17. The method for preparing an oxygen absorbing multilayer film having a smooth surface according to claim 14 wherein (a) the deoxidizing resin composition constituting the deoxidizing resin layer B and the thermoplastic resin constituting the oxygen-permeating resin layer A are co-extruded on the substrate film for lamination, or the deoxidizing resin composition and the thermoplastic resin which forms the oxygen-permeating resin layer A are separately extruded and laminated, and (b) in succession, the gas barrier layer D is laminated.

18. The method for preparing an oxygen absorbing multilayer film having a smooth surface according to claim 15 wherein (a) the deoxidizing resin composition constituting the deoxidizing resin layer B is extruded between said substrate film and the thermoplastic resin film constituting the oxygen-permeating resin layer A, and (b) in succession, the the gas barrier layer D is laminated.

19. The method for preparing an oxygen absorbing multilayer film having a smooth surface according to claim 15 wherein (a) the gas barrier layer is laminated on said substrate film and (b) in succession, the deoxidizing resin composition constituting the deoxidizing resin layer B is extruded and laminated on the thermoplastic resin constituting the oxygen-permeating resin layer A.

20. The method for preparing an oxygen absorbing multilayer film having a smooth surface according to claim 12 wherein said deoxidizing resin layer B has a thickness of 10 to 100 $\mu$m, said smoothing layer C having a thickness of 10 to 50 $\mu$m, and said particulate oxygen absorbing composition has a maximum particle diameter which is less than the sum of the thickness of said deoxidizing resin layer B and said smoothing layer C.

* * * * *